United States Patent [19]
Sturgis et al.

[11] Patent Number: 4,815,516
[45] Date of Patent: Mar. 28, 1989

[54] METHOD FOR RECOVERING CASTING REFRACTORY COMPOSITIONS FROM INVESTMENT CASTING SHELL MOLDS

[75] Inventors: David H. Sturgis, Gladstone; William W. Kemp, Milwaukie, both of Oreg.

[73] Assignee: Precision Castparts Corp., Portland, Oreg.

[21] Appl. No.: 164,249

[22] Filed: Mar. 4, 1988

[51] Int. Cl.⁴ ............................ B22C 1/00; B22C 9/00
[52] U.S. Cl. ........................................ 164/5; 164/529; 423/211; 423/263
[58] Field of Search .................. 164/5, 131, 132, 529; 423/21.1, 21.5, 263, 274

[56] References Cited

U.S. PATENT DOCUMENTS

| | | | |
|---|---|---|---|
| 3,635,658 | 1/1972 | Ferri et al. | 423/263 |
| 4,087,573 | 5/1978 | Holcombe, Jr. et al. | 423/263 X |
| 4,238,467 | 12/1980 | Dugan et al. | 423/263 |
| 4,386,056 | 5/1983 | Heytmeijer | 423/21.5 |
| 4,432,948 | 2/1984 | Heytmeijer | 423/21.5 |
| 4,703,806 | 11/1987 | Lassow et al. | 164/518 |

FOREIGN PATENT DOCUMENTS 530731 3/1977 U.S.S.R.
1276424 12/1986 U.S.S.R. .................................. 164/5

OTHER PUBLICATIONS

Feagin, R. C., "Casting of Reactive Metals Into Ceramic Molds" Sixth World Conference on Investment Casting (date unknown).
"Development of Titanium Alloy Casting Technology", Airesearch Manufacturing Company of Arizona, Aug. 1976.
Searle, Alfred B., "Refractory Materials: Their Manufacture and Uses", Charles Griffin & Co., Ltd., London, England. p. 122 (1971).
Searle, Alfred B., "Refractory Materials: Their Manufacture and Uses", Charles Griffin & Co., Ltd., London, England, 2d Ed. pp. 194–196 (1924).
Norton, F. H., "Refractories", McGraw-Hill Book Company, Inc., 3rd Ed., pp. 302–339 (1949).
Calvert, E. D., "An Investment Mold for Titanium Casting", Bureau of Mines Report of Investigations No. 8541 (1981).
Helferich, R. L., et al., "An Investigation of Yttrium Oxide as a Crucible Material for Melting Titanium", Dept. of Navy, Naval Ship Research & Development Center, Jan. 1973, Report 3911.
"Third Interim Technical Report Development of Titanium Alloy Casting Technology" Airesearch Mfg. Co. of Arizona, Jan 1975.

Primary Examiner—Fred A. Silverberg
Assistant Examiner—J. Reed Batten, Jr.
Attorney, Agent, or Firm—Klarquist, Sparkman, Campbell, Leigh & Whinston

[57] ABSTRACT $Y_2O_3$ is recovered from investment casting shell molds by introducing used mold materials into a dissolution reactor preferably consisting of a rotating vessel having an interior lining of acid and abrasion resistant material. An acid is combined with the materials in the reactor and agitated for a selected time period. Thereafter, the liquid remaining in the reactor is separated from the residual solids and removed. The liquid contains dissolved $Y_2O_3$ which is precipitated, preferably using oxalic acid to produce yttrium oxalate $[Y_2(C_2O_4)_3.9H_2O]$. The $Y_2(C_2O_4)_3.9H_2O$ is ultimately removed from the solution and calcined to produce high purity $Y_2O_3$.

31 Claims, 1 Drawing Sheet

METHOD FOR RECOVERING CASTING REFRACTORY COMPOSITIONS FROM INVESTMENT CASTING SHELL MOLDS

BACKGROUND OF THE INVENTION

The present invention generally relates to the chemical treatment of casting molds, and more particularly to the recovery of $Y_2O_3$ from used investment casting shell molds.

Yttrium oxide ($Y_2O_3$) is an important and useful metal casting refractory. It is thermodynamically stable in the presence of most reactive engineering metals including titanium, titanium alloys, and columbium (niobium). General information regarding the use of $Y_2O_3$ in metal casting processes is presented in Feagin, R. C., "Casting of Reactive Metals Into Ceramic Molds", Report of Sixth World Conference on Investment Casting, pp. 4:01–4:13, 1984: and Calvert, E. D., "An Investment Mold For Titanium Casting", United States Department of the Interior (Bureau of Mines), Report of Investigations No. 8541, 1981.

The use of $Y_2O_3$ as a refractory material in investment casting processes normally involves the production of casting shell molds containing significant quantities of $Y_2O_3$ in combination with other materials including hydrolyzed binders. Most often, silica binders are present in the molds, including tetraethyl ortho silicate. Once the casting process is completed, the molds are usually discarded. However, this is undesirable for both financial and environmental reasons. Recovery of $Y_2O_3$ from the used shell molds would offer a significant cost savings, and eliminate disposal problems.

The present invention involves a method whereby $Y_2O_3$ can be reclaimed from used investment casting shell molds which contain $Y_2O_3$ in combination with other materials. The method is highly efficient and results in the recovery of up to 85% or more of the $Y_2O_3$ originally present in the molds. Also, the recovered $Y_2O_3$ has a purity level of nearly 100%. This is accomplished using a minimal number of process steps, as described in detail below.

SUMMARY OF THE INVENTION

It is an object of the present invention to provide an efficient method for recovering $Y_2O_3$ from investment casting shell molds.

It is another object of the invention to provide a method for recovering $Y_2O_3$ from investment casting shell molds which is capable of producing a high percentage yield of $Y_2O_3$.

It is another object of the invention to provide a method for recovering $Y_2O_3$ from investment casting shell molds which yields a $Y_2O_3$ product of nearly 100% purity.

It is another object of the invention to provide a method for recovering $Y_2O_3$ from investment casting shell molds which uses a minimal number of processing steps.

It is a further object of the invention to provide a method for recovering $Y_2O_3$ from investment casting shell molds which avoids the use of heat-intensive processes and highly concentrated acids.

It is a further object of the invention to provide a method for recovering $Y_2O_3$ from investment casting shell molds which enables the substantially complete separation of $Y_2O_3$ from other compositions in the mold, including binder materials.

It is a still further object of the invention to provide a method for recovering $Y_2O_3$ from investment casting shell molds which is especially well suited to large scale casting operations.

In accordance with the foregoing objects, a highly efficient method for recovering $Y_2O_3$ from investment casting shell molds containing $Y_2O_3$ is disclosed. The used molds are first preferably crushed and physically separated from extraneous wire and/or residual metals. The product is then introduced into a dissolution reactor preferably consisting of a rotating vessel having an interior lining of acid-resistant material. At least one acid is then combined with the product in the dissolution reactor and agitated for a selected time period. Thereafter, the liquid remaining in the reactor is separated from the residual solids and removed. The liquid contains dissolved $Y_2O_3$ which is precipitated, preferably using oxalic acid to produce yttrium oxalate [$Y_2(C_2O_4)_3 \cdot 9H_2O$]. The $Y_2(C_2O_4)_3 \cdot 9H_2O$ is ultimately removed from the solution and calcined to produce high purity $Y_2O_3$.

These and other objects, features, and advantages of the invention shall be described in greater detail below in the following detailed description of a preferred embodiment, example, and drawing.

DETAILED DESCRIPTION OF A PREFERRED EMBODIMENT

Figure 1:
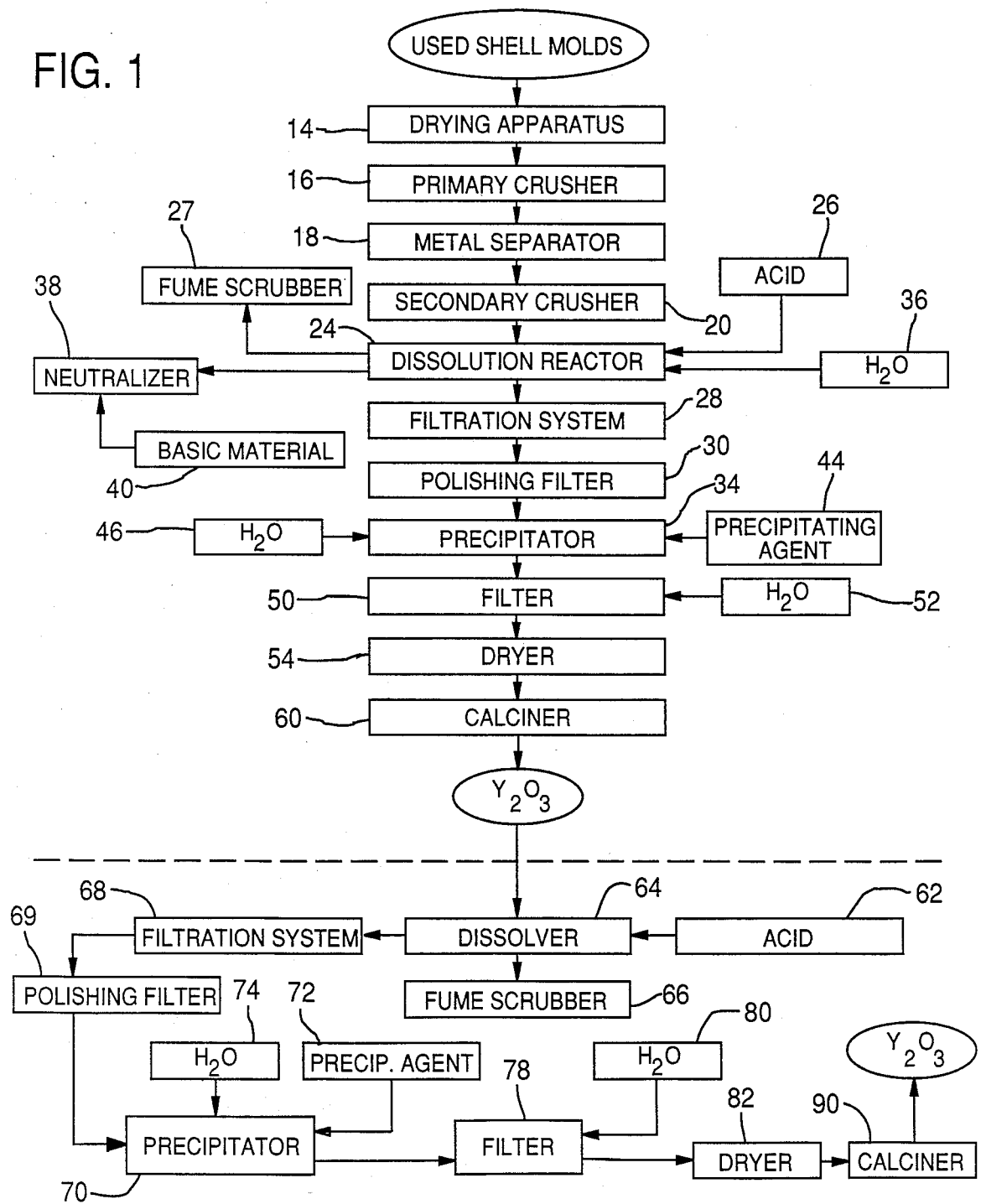
FIG. 1 is a schematic representation of the process steps used in conjunction with the present invention to recover $Y_2O_3$ from used investment casting shell molds.

The present invention involves a highly effective and efficient method for recovering $Y_2O_3$ from investment casting shell molds containing both $Y_2O_3$ and binder materials. The binders typically used in investment casting processes are those known in the art, including hydrolyzed ethyl silicate or colloidal silica binders, and particularly tetraethyl ortho silicate. Tetraethyl ortho silicate is commonly sold under the trade name Ethyl Silicate 40, which contains 40% $SiO_2$ and is available from the Stauffer Chemical Company of Stamford, Connecticut. Other exemplary binders include colloidal alumina and colloidal zirconia.

It is desirable from both a cost and environmental standpoint to reclaim $Y_2O_3$ in the molds for re-use at a later date. To accomplish this, the used molds are processed according to the procedure set forth in FIG. 1.

First, the used molds are separated from the completed casting through either conventional water blast procedures or other known methods of physical separation. Next, the molds are dried in a conventional drying apparatus 14 preferably consisting of a convection oven. The molds are normally dried until a moisture level of less than about 1.0% is attained as determined by conventional quantitative techniques. Usually, a temperature of about 250° F. will be sufficient to dry the molds, with the total drying time depending on the amount of material involved. Although it is preferred that drying take place, it may be possible to omit the drying step if time or cost considerations render it impractical. Omission of the drying step might require a adjustment in the mold dissolution stage of the process, as described below.

Upon completion of drying, the molds are then crushed in a primary crusher 16 consisting of a jaw crusher, hammer mill or the like. Thereafter, extraneous wire and/or residual metals are removed from the crushed product using a metal separator 18. An electromagnet will work effectively as the metal separator 18, although it may also be possible to remove large pieces of metal or wire by hand. Metal/wire removal is important in order to minimize the total amount of contaminants present in the final product.

After wire/metal removal, the crushed product is introduced into a secondary crusher 20, examples of which would include a hammer mill or roll crusher. At this stage, the product is pulverized to a particle size not exceeding about 1.0 inch in any dimension.

While the two-step crushing procedure described above is preferred and will work effectively in the present invention, crushing may be done in one step, or eliminated entirely if equipment costs and speed are of prime concern.

Next, the pulverized product is placed in a dissolution reactor 24 preferably consisting of a rotating vessel or drum. In a preferred embodiment, the dissolution reactor 24 is constructed of or lined with an abrasion and acid-resistant material, such a plastic, rubber or ceramic composition. For example, Teflon ®, aluminum oxide, or polyethylene plastic will work effectively for this purpose.

The dissolution reactor 24 is filled to a maximum of about 80% of its total volume with the pulverized product. The addition of product beyond this level may prevent the materials therein from properly mixing and slow the dissolution process.

In the alternative, a conventional vibratory mill may be used as the dissolution reactor 24 instead of the rotating drum. Like the drum embodiment, the inner surface of the vibratory mill would be comprised of an abrasion and acid-resistant material as described above.

Once the pulverized product is in the dissolution reactor 24, at least one acid 26 is added to the reactor and combined with the product. Exemplary acids suitable for this purpose include nitric or hydrochloric acid solutions, with nitric being preferred. The acid is maintained at room temperature (approximately 70° F.) and should have a normality of between 1.0 and 15.0. Approximately one-half gallon of acid is used per 1.0–25.0 pounds of pulverized product. Within these parameters, more acid per pound of pulverized product would most likely be needed if the raw shell materials were not initially dried, as described above. This is because more water will remain in the product which will require a somewhat greater amount of acid to achieve efficient dissolution.

As described above, it is preferred that a rotating vessel system be used as the dissolution reactor 24. Once the acid and pulverized product are combined in the vessel, it is rotated at a velocity of about 10.0–35.0% of a critical speed defined by the following formula:

$$N_{rpm} = 300/\sqrt{R}$$

[$N$ = revolutions/min. and $R$ = radius of reactor vessel in cm].

It is important that this rotational speed be maintained since excessive speeds outside of the above range could prevent proper mixing of the materials in the reactor.

Rotation of the vessel is allowed to continue for a time period of between 1–10 days in order to completely mix the acid with the product. Next, the vessel is stopped and the materials therein allowed to settle for about 4.0 to 6.0 hours. The acid solution in the vessel is then removed by suction, decantation, or gravity, and introduced into a filtration system 28 to remove any residual solids. The filtration system 28 may consist of a vacuum pan filter or centrifuge of conventional design. In a preferred form of the invention, any acidic vapors from the dissolution reactor 24 are routed into a fume scrubber 27 of conventional design prior to release.

The acid solution, which includes dissolved $Y_2O_3$ is then passed through a polishing filter 30 which includes any conventional filter media capable of removing particulates as small as 0.2 micron. Next, the filtered acid solution is directed into a precipitator tank 34, and treated as will be described below.

At this stage in the process, residual solids still remain in the dissolution reactor 24. To obtain a maximum yield of $Y_2O_3$, deionized water 36 may be added to the dissolution reactor 24 in an amount equal to the volume of acid solution previously removed. If a rotating vessel system is used as the dissolution reactor 24, the vessel is rotated for at least one hour in order to thoroughly mix the water with the residual solids. The water is then removed from the vessel by suction, decantation or gravity, and passed through the filtration system 28 and polishing filter 30. It is then mixed with the acid solution in the precipitator tank 34 to form a liquid product containing dissolved $Y_2O_3$.

The solids remaining in the dissolution reactor 24 which consist of binder materials and other extraneous products are then disposed of, preferably by passage into a neutralizer tank 38 simultaneously with the addition of a basic material 40 (e.g. NaOH, KOH, or $Na_2CO_3$). This produces a non-toxic, neutralized compound which may then be disposed of in a land fill or other waste storage area.

The liquid product in the precipitator tank 34 is now ready for treatment. A temperature of about 70° F.–150° F. (preferably about 115° F.) is maintained in the precipitator tank 34 simultaneously with the addition of a precipitating agent 44. The most suitable precipitating agent 44 usable in the invention consists of oxalic acid. The oxalic acid may be added in either crystal form (dihydrate) or as a solution. For example, a 9% solution of oxalic acid in water will work effectively in the precipitator tank 34. If the crystal form is used, two pounds of oxalic acid crystals are preferably added for each pound of dissolved yttrium oxide in the solution. However, prior to addition of the precipitating agent 44, additional quantities of deionized water 46 may optionally be added to the solution. The deionized water 46 will dilute the solution in the precipitator tank 34. Dilution enables the amount of precipitating agent 44 needed for $Y_2O_3$ recovery to be decreased. If used, the deionized water 46 should be added to the solution in a water : solution volume ratio ranging from 1:1 to 8:1 depending upon the concentration of acid in the solution.

When oxalic acid is used in the precipitator tank 34, yttrium oxalate [$Y_2(C_2O_4)_3.9H_2O$] is formed as a solid precipitate. This precipitate is then introduced into a filter 50 (preferably of the vacuum pan type) to separate the precipitate from the remaining liquid.

After filtration, deionized water 52 is passed through the product collected in the filter 50 in an amount sufficient to wash away any soluble impurities in the $Y_2($-

$C_2O_4)_3.9H_2O$. The collected $Y_2(C_2O_4)_3.9H_2O$ is then dried in a dryer 54 preferably consisting of a conventional convection oven at a temperature of about 150° F., or whatever is necessary to remove any remaining moisture. After drying, the $Y_2(C_2O_4)_3.9H_2O$ is calcined in a calciner 60 at a temperature of at least 1500° F. for about 2 hours to remove all of the waters of hydration associated with the $Y_2(C_2O_4)_3.9H_2O$. In the present invention, the calciner 60 typically consists of a ceramic container otherwise known as a "sagger" box which is filled with the solid precipitate and placed in a kiln for firing. The resulting product consists of highly pure $Y_2O_3$ which may be used again in the investment casting process.

As previously described, the use of a dissolution reactor 24 constructed of or having an acid-resistant lining is especially important in order to minimize contamination of the final product. However, if such a reactor is not available or cannot be used, further purification of the $Y_2O_3$ product will be necessary after calcination in calciner 60. The process steps for accomplishing further purification are schematically shown in FIG. 1 beneath the dashed line.

After calcining is completed, the $Y_2O_3$ product is introduced into a dissolver unit 64 typically consisting of a jacketed tank in association with an agitator system. Added to the product within the dissolver unit 64 is at least one acid 62 heated to a temperature of about 150°–200° F. Exemplary acids suitable for this purpose include nitric or hydrochloric acid solutions (with nitric being preferred) having a normality ranging from about 6.0–15.0.

The time required for dissolving the calcined product in the dissolver unit 64 is approximately 1–2 hours. Between about 0.5 and 1.5 pounds of calcined product are preferably used per gallon of acid. In a preferred form of the invention, acidic vapors are routed from the dissolver unit 64 through a fume scrubber 66 of conventional design prior to release.

Thereafter, the resulting solution is introduced into a filtration system 68 preferably of the vacuum pan variety, followed by passage through a polishing filter 69 having filter media capable of removing particulates as small as 0.2 micron. The filtered solution is then treated in a secondary precipitator tank 70. In the secondary precipitator tank 70, a temperature of about 70°–150° F. (preferably about 115° F.) is maintained simultaneously with the addition of a precipitating agent 72. Again, the precipitating agent 72 most suitable for this purpose consists of oxalic acid in either crystal form (dihydrate) or as a solution. A 9% solution of oxalic acid will work effectively in the precipitator tank 70. If the crystalline form is used, two pounds of oxalic acid crystals are preferably added for each pound of dissolved yttrium oxide in the solution.

Prior to addition of the precipitating agent 72, deionized water 74 is added to the solution in the precipitator tank 70 in the same amount described above with respect to the precipitator tank 34. When oxalic acid is used in the precipitator tank 70, yttrium oxalate precipitate $[Y_2(C_2O_4)_3.9H_2O]$ is formed. This precipitate is then introduced into a filter 78 (e.g. vacuum pan type) and washed with deionized water 80 in an amount sufficient to flush away any soluble impurities in the $Y_2(C_2O_4)_3.9H_2O$. The collected $Y_2(C_2O_4)_3.9H_2O$ is then dried in a dryer 82 preferably consisting of a convection oven at a temperature of about 150° F. or whatever is necessary to remove any remaining moisture. After drying, the $Y_2(C_2O_4)_3.9H_2O$ is calcined in a calciner 90 of the same type as calciner 60 at a temperature of at least 1500° F. for about 2 hours to again remove all the waters of hydration associated with the $Y_2(C_2O_4)_3.9H_2O$. The resulting product consists of highly pure $Y_2O_3$.

Use of the foregoing process is beneficial from both a cost and environmental standpoint. It enables the recovery of a $Y_2O_3$ product having a purity of nearly 100% (about 99.7–99.9%). In addition, recovery yields of up to 85% $Y_2O_3$ or more with respect to the amount of $Y_2O_3$ originally present in the molds are obtainable.

EXAMPLE

In accordance with the present invention, used casting molds were treated to recover $Y_2O_3$. The molds contained between 0.5–4.0% $Y_2O_3$ in combination with conventional investment casting materials including but not limited to alumina, zircon, silica materials and/or calcined alumino silicates.

To recover $Y_2O_3$, the molds were first pulverized in a jaw crusher to a particle size not excceeding 1.0 inch in any dimension, followed by manual wire/metal removal.

The crushed product was then introduced into a rotating reactor consisting of a cylindrical polyethylene container having a capacity of one liter. Approximately 1000 grams of the crushed product were added to the reactor simultaneously with the addition of 600 ml of 2N $HNO_3$.

The reactor was then rotated at approximately 38 rpm over a time period of 6 days. Next, the acid solution (450 ml) was removed from the reactor and passed through a vacuum pan filter and a polishing filter, followed by collection of the solution in a precipitator tank.

Prior to treatment of the acid solution, 450 ml. of deionized water were added to the residual solids in the reactor, followed by rotation of the reactor at a speed of 38 rpm for about 2.0 hours. The resulting aqueous solution was then removed, passed through a vacuum pan filter and polishing filter, and added to the previously collected acid solution in the precipitator tank.

Thereafter, the contents of the precipitator tank were heated at approximately 115° F., followed by precipitation of the $Y_2O_3$ with 40 grams of oxalic acid crystals. After about 20 minutes, the precipitated $Y_2(C_2O_4)_3.9H_2O$ was removed from the solution, dried, and calcined in a kiln at about 1,800° F. for 2 hours. The resulting $Y_2O_3$ had a purity of 99.9%. In addition, the percentage yield of $Y_2O_3$ was approximately 85% of the total amount contained in the used shell material.

Having herein described a preferred embodiment of the invention, it is anticipated that suitable modifications may be made by those skilled in the art within the scope of the invention. Accordingly, the present invention shall be construed only in accordance with the following claims.

What is claimed is:

1. A method for the recovery of $Y_2O_3$ from used investment casting mold materials comprising:

placing mold materials having $Y_2O_3$ therein in a reactor;

forming a solution from said mold materials in said reactor, said solution having $Y_2O_3$ and residual solids from said mold materials therein, said $Y_2O_3$ being dissolved in said solution, with said residual solids remaining undissolved;

removing said solution from said reactor; and
treating said solution to obtain $Y_2O_3$ therefrom.

2. The method of claim 1 wherein said mold materials are dried prior to said placing thereof in said reactor.

3. The method of claim 1 wherein said mold materials are crushed prior to said placing thereof in said reactor.

4. The method of claim 1 wherein said reactor comprises a rotating vessel.

5. The method of claim 4 wherein said vessel has an inner surface comprised of a material which is both acid and abrasion-resistant.

6. The method of claim 5 wherein said material comprising the inner surface of said vessel is selected from the group consisting of rubber, plastic and ceramic.

7. The method of claim 1 wherein said reactor is filled with said mold materials in an amount not exceeding about 80% of the total volume of said reactor.

8. The method of claim 1 wherein said solution is formed by the combination of said mold materials with at least one acid.

9. The method of claim 8 wherein said acid is selected from the group consisting of nitric acid and hydrochloric acid.

10. The method of claim 8 wherein the normality of said acid is about 1.0–15.0.

11. The method of claim 8 wherein about 1.0–25.0 pounds of said mold materials are used per one-half gallon of said acid in said reactor.

12. The method of claim 4 wherein said vessel with said solution therein is rotated at a velocity of about 10–35% of a critical speed defined by the formula $N=300/\sqrt{R}$, wherein N=revolutions of said vessel per minute and R=the radius of said vessel in centimeters.

13. The method of claim 12 wherein said vessel is rotated over a period of about 1–10 days.

14. The method of claim 1 wherein prior to said treating of said solution to obtain $Y_2O_3$ therefrom, said method further comprises the steps of:
allowing said residual solids to remain in said reactor after said removing of said solution therefrom;
adding water to said reactor in combination with said residual solids therein;
causing said water and residual solids to be mixed in said reactor;
removing said water from said reactor;
combining said water with said solution.

15. The method of claim 1 wherein said treating of said solution to obtain $Y_2O_3$ therefrom comprises the steps of:
adding a precipitating agent to said solution in order to form a yttrium precipitate;
removing said yttrium precipitate from said solution; and
calcining said removed yttrium precipitate in order to produce a high purity $Y_2O_3$ product.

16. The method of claim 15 wherein said precipitating agent comprises oxalic acid.

17. The method of claim 14 wherein said treating of said solution to obtain $Y_2O_3$ therefrom comprises the steps of:
adding a precipitating agent to said solution in order to form a yttrium precipitate;
removing said yttrium precipitate from said solution; and
calcining said removed yttrium precipitate in order to produce a high purity $Y_2O_3$ product.

18. The method of claim 17 wherein said precipitating agent comprises oxalic acid.

19. A method for the recovery of $Y_2O_3$ from used investment casting mold materials comprising:
placing mold materials having $Y_2O_3$ therein in a rotating reactor vessel having an inner surface comprised of a material which is both acid and abrasion resistant;
adding at least one acid to said mold materials in said vessel in order to produce a solution having $Y_2O_3$ and residual solids from said mold materials therein, said $Y_2O_3$ being dissolved in said solution, with said residual solids remaining undissolved;
rotating said vessel with said solution therein;
removing said solution from said vessel after said rotating thereof; and
treating said solution to obtain $Y_2O_3$ therefrom.

20. The method of claim 19 wherein said mold materials are dried and crushed prior to said placing thereof in said vessel.

21. The method of claim 19 wherein prior to said treating of said solution to obtain $Y_2O_3$ therefrom, said method further comprises the steps of:
allowing said residual solids to remain in said vessel after said removing of said solution therefrom;
adding water to said vessel in combination with said residual solids therein;
rotating said vessel in order to mix said water and residual solids;
removing said water from said vessel; and
combining said water with said solution.

22. The method of claim 19 wherein said vessel is filled with said mold materials in an amount not exceeding about 80% of the total volume of said vessel.

23. The method of claim 19 wherein said acid is selected from the group consisting of nitric acid and hydrochloric acid.

24. The method of claim 19 wherein the normality of said acid is about 1.0–15.0.

25. The method of claim 19 wherein about 1.0–25.0 pounds of said mold materials are used per one-half gallon of said acid in said vessel.

26. The method of claim 19 wherein said vessel with said solution therein is rotated at a velocity of about 10–35% of a critical speed defined by the formula $N=300/\sqrt{R}$ wherein N equals revolutions of said vessel per minute and R equals the radius of said vessel in centimeters.

27. The method of claim 26 wherein said rotating of said vessel with said solution therein occurs for about 1–10 days.

28. The method of claim 19 wherein said treating of said solution to obtain $Y_2O_3$ therefrom comprises the steps of:
adding a precipitating agent to said solution in order to form a yttrium precipitate;
removing said yttrium precipitate from said solution; and
calcining said removed yttrium precipitate in order to produce a high purity $Y_2O_3$ product.

29. The method of claim 28 wherein said precipitating agent comprises oxalic acid.

30. The method of claim 21 wherein said rotating of said vessel with said water and residual solids therein occurs for at least 1.0 hour.

31. A method for the recovery of $Y_2O_3$ from used investment casting mold materials comprising:
drying mold materials having $Y_2O_3$ therein;
crushing said mold materials after said drying to form a pulverized product;

placing said pulverized product in a rotating reactor vessel having an inner surface comprised of a material which is both acid and abrasion resistant selected from the group consisting of rubber, plastic and ceramic, said vessel being filled with said pulverized product in an amount not exceeding about 80% of the total volume of said vessel;

adding at least one acid selected from the group consisting of nitric acid and hydrochloric acid and having a normality of about 1.0–15.0 to said pulverized product in said vessel in order to produce a solution having $Y_2O_3$ and residual solids from said mold materials therein, said $Y_2O_3$ being dissolved in said solution, with said residual solids remaining undissolved, wherein about 1.0–25.0 pounds of said pulverized product are used per one-half gallon of said acid;

allowing said vessel to rotate with said solution therein over a period of about 1–10 days at a velocity of about 10–35% of a critical speed determined by the formula $N=300/\sqrt{R}$, wherein N equals revolutions of said vessel per minute and R equals the radius of said vessel in centimeters;

removing said solution from said vessel;

allowing said residual solids to remain in said vessel after said removing of said solution therefrom;

adding water to said vessel in combination with said residual solids therein, said water being added in a volume equal to that of said solution removed from said vessel;

rotating said vessel in order to mix said water with said residual solids for at least 1.0 hour;

removing said water from said vessel;

combining said water with said solution previously removed from said vessel to form a liquid product;

adding oxalic acid to said liquid product in order to form a yttrium oxalate precipitate;

removing said yttrium oxalate precipitate from said liquid product; and calcining said removed yttrium oxalate precipitate in order to produce a high purity $Y_2O_3$ product.

* * * * *